(12) United States Patent
Alkasimi et al.

(10) Patent No.: US 8,615,422 B1
(45) Date of Patent: Dec. 24, 2013

(54) AIRLINE PRICING SYSTEM AND METHOD

(75) Inventors: Hyder Alkasimi, Flower Mound, TX (US); RoseMary Dimock, Lewisville, TX (US); Roman Shevchuk, Grapevine, TX (US)

(73) Assignee: American Airlines, Inc., Fort Worth, TX (US)

( * ) Notice: Subject to any disclaimer, the term of this patent is extended or adjusted under 35 U.S.C. 154(b) by 0 days.

(21) Appl. No.: 13/293,331

(22) Filed: Nov. 10, 2011

(51) Int. Cl.
*G06Q 10/00* (2012.01)
*G06Q 30/02* (2012.01)

(52) U.S. Cl.
CPC .................. *G06Q 30/0206* (2013.01)
USPC ....................................................... 705/7.35

(58) Field of Classification Search
None
See application file for complete search history.

(56) References Cited

U.S. PATENT DOCUMENTS

| | | | |
|---|---|---|---|
| 7,899,701 B1* | 3/2011 | Odom | 705/7.35 |
| 8,200,549 B1* | 6/2012 | Crean et al. | 705/26.64 |
| 2001/0044788 A1* | 11/2001 | Demir et al. | 705/400 |
| 2002/0032666 A1* | 3/2002 | Kawamura et al. | 705/400 |
| 2002/0059101 A1* | 5/2002 | Ratliff et al. | 705/14 |
| 2002/0065699 A1* | 5/2002 | Talluri | 705/8 |
| 2002/0103849 A1* | 8/2002 | Smith | 709/201 |
| 2002/0120540 A1* | 8/2002 | Kende et al. | 705/35 |
| 2003/0004764 A1* | 1/2003 | Niedringhaus | 705/7 |
| 2003/0078836 A2* | 4/2003 | Ratliff et al. | 705/14 |
| 2003/0154129 A1* | 8/2003 | Goff | 705/14 |
| 2003/0191725 A1* | 10/2003 | Ratliff et al. | 705/400 |
| 2004/0068459 A1* | 4/2004 | Goulet et al. | 705/37 |
| 2005/0004819 A1* | 1/2005 | Etzioni et al. | 705/5 |
| 2005/0159974 A1* | 7/2005 | Moss et al. | 705/1 |
| 2006/0100914 A1* | 5/2006 | Jafri et al. | 705/5 |
| 2006/0200370 A1* | 9/2006 | Ratliff et al. | 705/5 |
| 2006/0218025 A1* | 9/2006 | Miller et al. | 705/5 |
| 2007/0021991 A1* | 1/2007 | Etzioni et al. | 705/5 |
| 2007/0073593 A1* | 3/2007 | Perry et al. | 705/26 |
| 2007/0124259 A1* | 5/2007 | Sussman et al. | 705/400 |
| 2007/0129975 A1* | 6/2007 | Jafri et al. | 705/5 |
| 2007/0244766 A1* | 10/2007 | Goel | 705/26 |
| 2007/0244767 A1* | 10/2007 | Goel | 705/26 |
| 2008/0052185 A1* | 2/2008 | Goel | 705/26 |
| 2009/0182588 A1* | 7/2009 | Ashby et al. | 705/5 |
| 2009/0216571 A1* | 8/2009 | Sunshine et al. | 705/5 |
| 2010/0100506 A1* | 4/2010 | Marot | 705/400 |
| 2010/0114954 A1* | 5/2010 | Sareen et al. | 707/776 |
| 2010/0217650 A1* | 8/2010 | Hartnell | 705/10 |
| 2011/0022428 A1* | 1/2011 | Parker | 705/6 |
| 2011/0040656 A1* | 2/2011 | Groetzinger et al. | 705/27.1 |
| 2011/0251917 A1* | 10/2011 | Etzioni et al. | 705/26.4 |
| 2012/0016718 A1* | 1/2012 | Kahn et al. | 705/7.31 |
| 2012/0209662 A1* | 8/2012 | Kahn et al. | 705/7.31 |
| 2012/0239455 A1* | 9/2012 | Crean et al. | 705/7.31 |
| 2012/0284062 A1* | 11/2012 | Aubry et al. | 705/5 |
| 2013/0024404 A1* | 1/2013 | Zacharia et al. | 706/12 |

OTHER PUBLICATIONS

Lua WF (2007). Matching the Lowest Fare Seat Availability in Airline Revenue Management Systems. Thesis. Septermber. pp. 1-150. http://dspace.mit.edu/bitstream/handle/1721.1/42054/230957335.pdf?sequence=1 & also http://hdl.handle.net/1721.1/42054.*

* cited by examiner

*Primary Examiner* — Brett Feeney
(74) *Attorney, Agent, or Firm* — Haynes and Boone, LLP

(57) ABSTRACT

An airline pricing system and method according to which prices, such as airline ticket prices or fares, are automatically set based on selected pricing strategies and patterns detected within airline fare data.

6 Claims, 9 Drawing Sheets

AIRLINE PRICING SYSTEM AND METHOD

BACKGROUND

The present disclosure relates in general to setting prices, and in particular to an airline pricing system and method for automatically setting prices such as, for example, airline ticket prices or fares.

DETAILED DESCRIPTION

Figure 1:
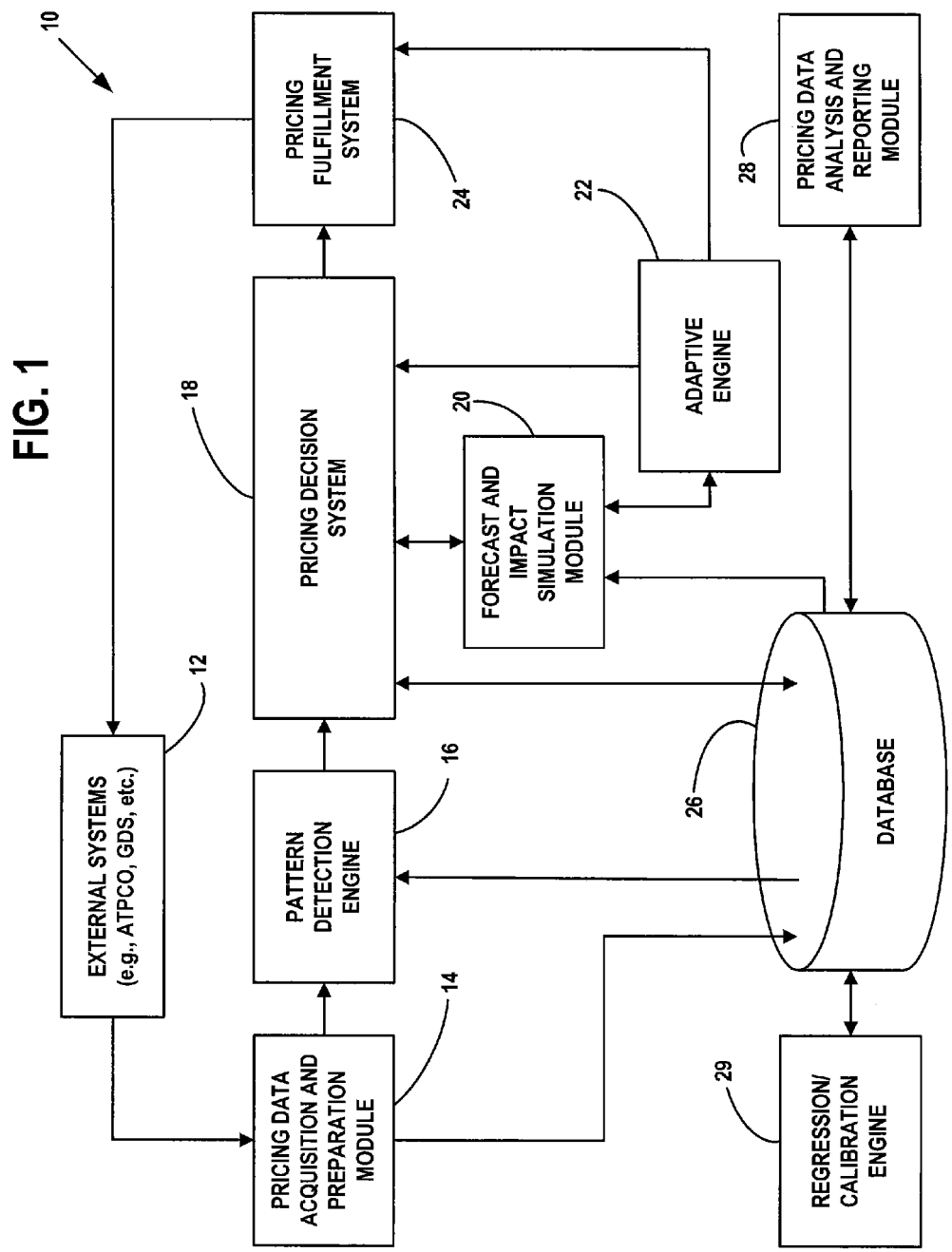
FIG. 1 is a diagrammatic illustration of an airline pricing system according to an exemplary embodiment, the system including a database, a pricing data acquisition and preparation module, a pattern detection system, and a pricing decision system.

In an exemplary embodiment, as illustrated in FIG. 1, an airline pricing system for creating, managing and maintaining the airline's pricing product is generally referred to by the reference numeral 10 and includes one or more external systems 12. A pricing data acquisition and preparation module 14 is operably coupled to the external systems 12. A pattern detection engine 16 is operably coupled to the pricing data acquisition and preparation module 14. A pricing decision system 18 is operably coupled to the pattern detection engine 16. A forecast and impact simulation module 20 is operably coupled to the pricing decision system 18. An adaptive engine 22 is operably coupled to each of the forecast and impact simulation module 20 and the pricing decision system 18. A pricing fulfillment system 24 is operably coupled to the pricing decision system 18. A database 26 is operably coupled to each of the pricing data acquisition and preparation module 14, the pattern detection engine 16, the pricing decision system 18, and the forecast and impact simulation module 20, as well as to a pricing data analysis and reporting module 28 and a regression/calibration engine 29.

In an exemplary embodiment, the one or more external systems 12 are configured to collect and distribute airline fare data, including fare-related data. In an exemplary embodiment, the one or more external systems 12 include one or more Global Distribution Systems (GDS's) such as, for example, Galileo, Sabre, Amadeus, and/or any combination thereof, Airline Tariff Publishing Company (ATPCO), one or more Computer Reservation Systems (CRS's), and/or any combination thereof.

In several exemplary embodiments, one or more of the module 14, the engine 16, the system 18, the module 20, the engine 22, the system 24, the database 26, the module 28 and the engine 29 include a database (not shown), which, in turn, includes a data storage layer and an abstraction layer, which routes data to modules that utilize and augment the data. In several exemplary embodiments, one or more of the module 14, the engine 16, the system 18, the module 20, the engine 22, the system 24, the database 26, the module 28 and the engine 29 include a server, such as a web application server, which in several exemplary embodiments includes and/or executes one or more web-based programs, Intranet-based programs, and/or any combination thereof. In an exemplary embodiment, the components of the system 10 are operably coupled to, and communicate with, each other via a network (not shown), which may include the Internet, one or more local area networks, one or more wide area networks, one or more cellular networks, one or more wireless networks, one or more voice networks, one or more data networks, one or more communication systems, and/or any combination thereof.

In several exemplary embodiments, one or more of the components of the system 10 and/or content stored therein, and/or any combination thereof, are part of, and/or are distributed throughout, the system 10 and/or one or more other components thereof. In several exemplary embodiments, the platforms of the system 10 are identical, different, or vary with respect to equipment, peripherals, hardware architecture and/or specifications, software architecture and/or specifications, and/or any combination thereof.

Figure 2:
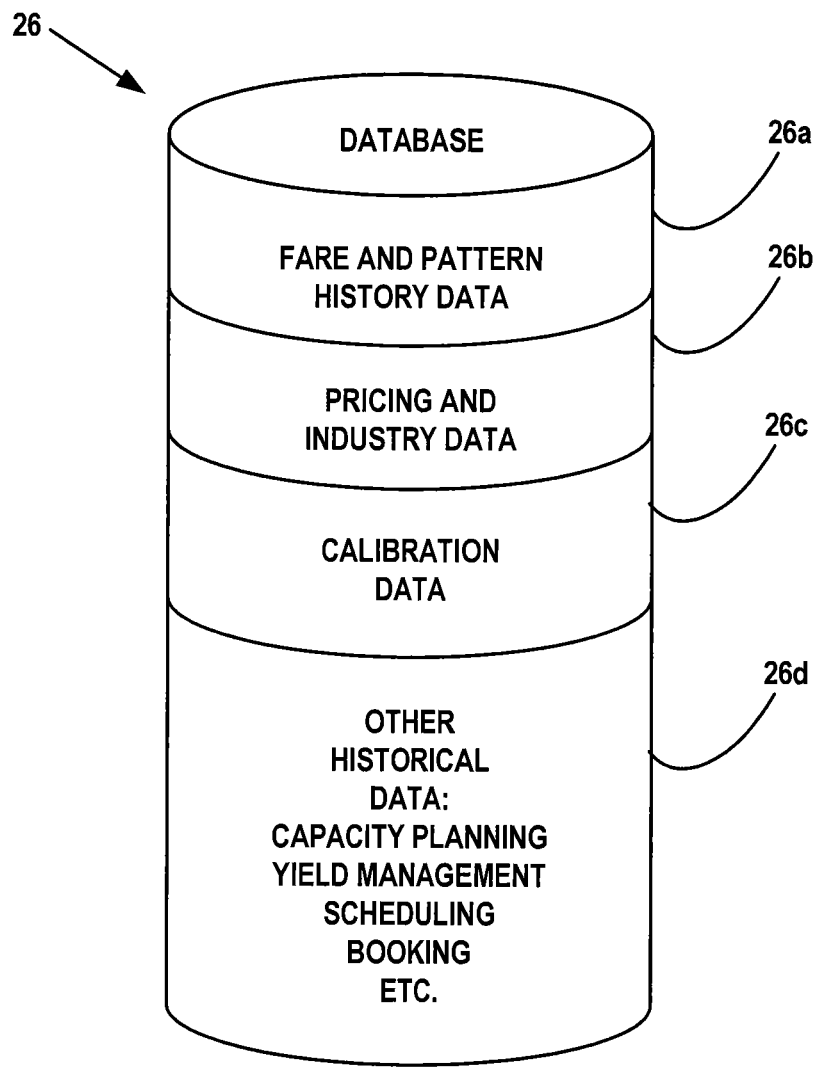
FIG. 2 is a diagrammatic illustration of the database of FIG. 1, according to an exemplary embodiment.

In an exemplary embodiment, as illustrated in FIG. 2 with continuing reference to FIG. 1, the database 26 includes fare and pattern history data 26a, pricing and industry data 26b, calibration data 26c, and other historical data 26d such as, for example, capacity planning data, yield management data, scheduling data, booking data, etc.

Figure 3:
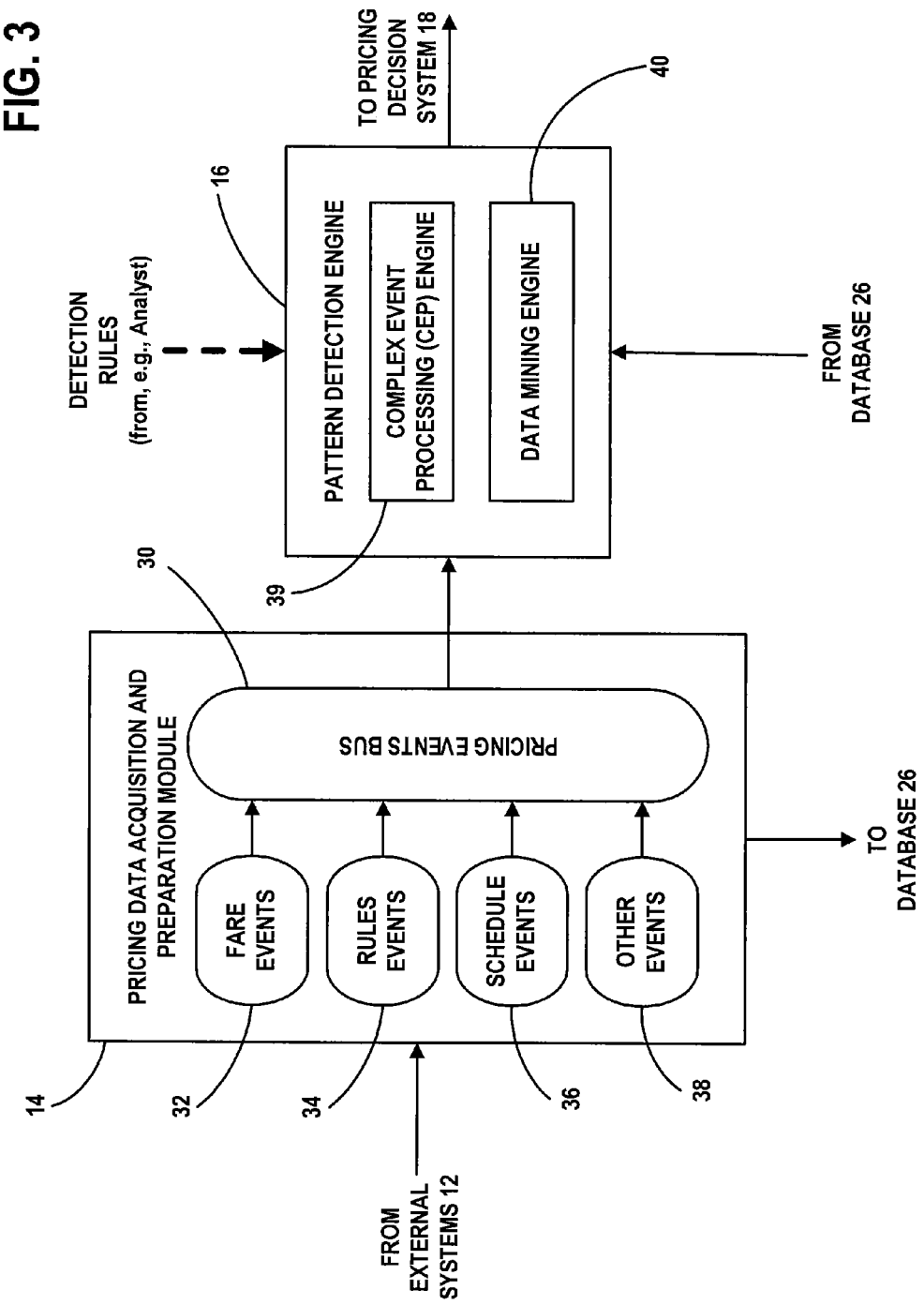
FIG. 3 is a diagrammatic illustration of the pricing data acquisition and preparation module of FIG. 1, and the pattern detection system of FIG. 1, according to respective exemplary embodiments.

In an exemplary embodiment, as illustrated in FIG. 3 with continuing reference to FIGS. 1 and 2, the pricing data acquisition and preparation module 14 includes a pricing events bus 30, which is operably coupled to a fare events data set 32, a rules events data set 34, a schedule events data set 36, and other events data set(s) 38. The pricing events bus 30 is operably coupled to the pattern detection engine 16. The pattern detection engine 16 includes a complex event processing (CEP) engine 39, and a data mining engine 40.

Figure 4:
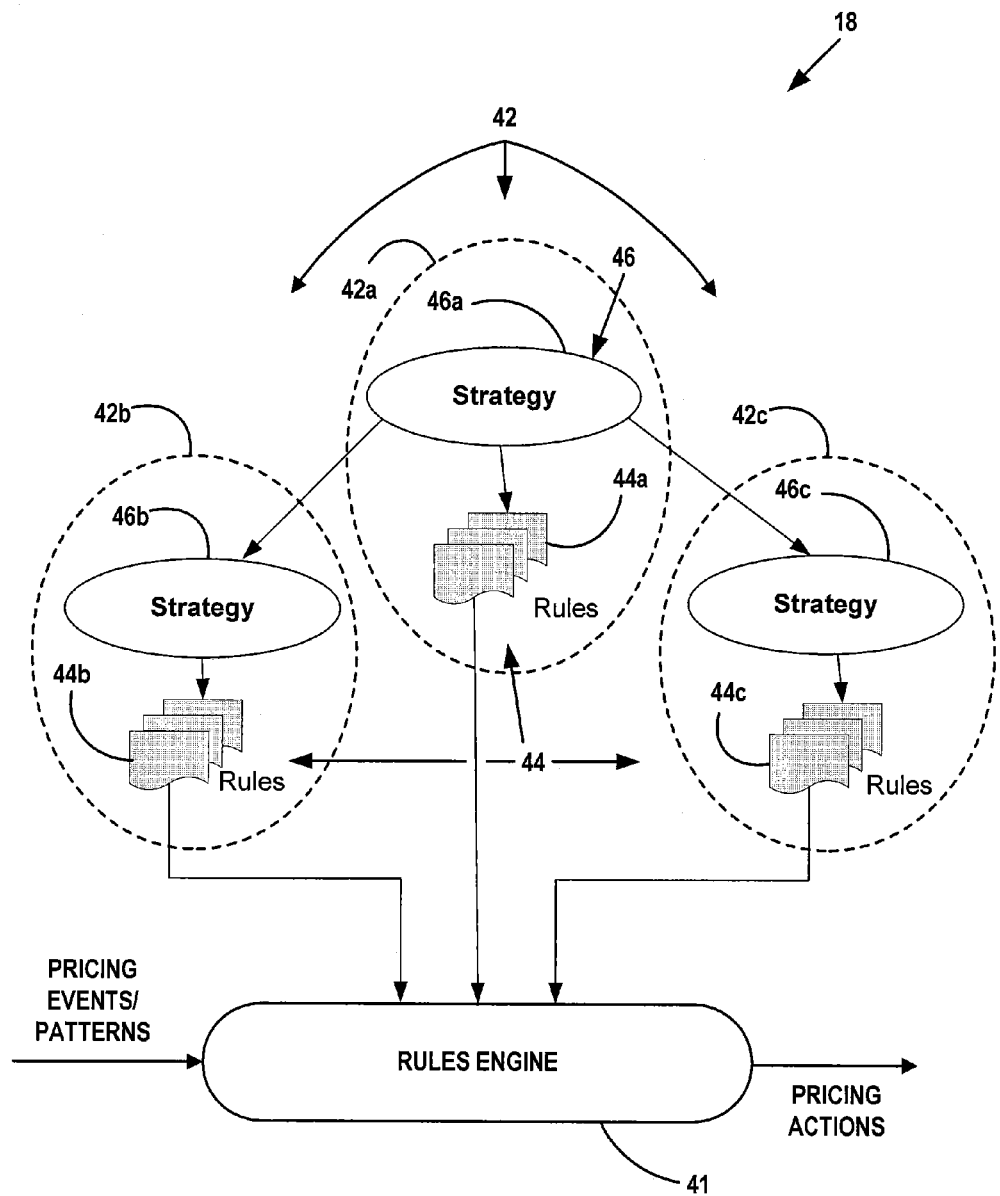
FIGS. 4, 5 and 6 are diagrammatic illustrations of portions of the pricing decision system of FIG. 1, according to respective exemplary embodiments.

In an exemplary embodiment, as illustrated in FIG. 4 with continuing reference to FIGS. 1-3, the pricing decision system 18 includes a rules engine 41, to which a plurality of rule modules 42 is operably coupled. Each of the rule modules 42 includes a set of rules 44 and is associated with one of a plurality of strategies 46. For example, as shown in FIG. 4, the plurality of rule modules 42 includes rules modules 42a, 42b and 42c, which include rule sets 44a, 44b and 44c, respectively, which are associated with pricing strategies 46a, 46b and 46c, respectively. Each of the strategies 46a, 46b and 46c is a pricing intent by the airline with which the system 10 is associated. For example, a pricing strategy or intent may be to match a competitor during a certain time period in a certain geographic area. The rule sets 44a, 44b and 44c includes fares and rules that specify how to process the associated strategies 46a, 46b and 46c, respectively, given pricing events and patterns.

In operation, in an exemplary embodiment, with continuing reference to FIGS. 1-4, the pricing data acquisition and preparation module 14 automatically receives airline fare data from the one of more external systems 12, as shown in each of FIGS. 1 and 3. In an exemplary embodiment, the module 14 automatically receives the data passively and/or actively. In an exemplary embodiment, the module 14 automatically receives the data actively by requesting the data, acquiring the data, collecting the data, and/or any combination thereof. The received airline fare data includes airline fare data and fare-related data. In several exemplary embodiments, such received data includes prices for airline tickets between different pairs of locations, the dates and times the prices are valid, any required travel itinerary or itineraries for the prices, additional restrictions on the prices, etc. In several exemplary embodiments, the module 14 provides automatic data collection and management functionality. The module 14 collects and stores real-time pricing data received from the external systems 12.

As shown in FIG. 3, the module 14 prepares the received data by, for example, categorizing the received data into the fare events data set 32, the rules events data set 34, the schedule events data set 36, and the other events data set(s) 38. For example, data categorized in the fare events data set 32 may include a fare increase or price match by a particular airline, data categorized in the rules event data set 34 may include a change in a particular airline's pricing rules, and data categorized in the schedule events data set 36 may include a new or modified flight schedule by a particular airline. The module 14 transmits the received data to the database 26. In an exemplary embodiment, the module 14 transmits the received data in the data sets 32, 34, 36 and 38 to the database 26 via the pricing events bus 30. In an exemplary embodiment, the received data transmitted to database 26 forms part of the fare and pattern history data 26a, the pricing and industry data 26b, the calibration data 26c, the other historical data 26d, and/or any combination thereof. In addition to transmitting the received data to the database 26, the module 14 transmits the received data in the data sets 32, 34, 36 and 38 to the pattern detection engine 16 via the pricing events bus 30.

The pattern detection engine 16 identifies and detects patterns and events that must be acted on to fulfill predetermined pricing strategies, such as the strategies 46a, 46b and 46c. As indicated in FIG. 2, the pattern detection engine 16 detects patterns in the data using both the complex processing event engine 39 and the data mining engine 40. In particular, the complex processing event engine 39 correlates multiple events, including multiple events that are time dependent. For example, in part on the basis of a fare event in which "Airline B matches Airline A's fare increase," the complex processing event engine 39 detects a pattern of (1) a fare increase by Airline A, and (2) a fare increase by Airline B within a certain time interval after the fare increase by Airline A. The data mining engine 40 detects patterns in the received data using data mining techniques. For example, the data mining engine 40 detects that a particular airline is gradually increasing its presence in an airport or a portion thereof. In several exemplary embodiments, as shown in FIG. 2, the pattern detection engine 16 detects patterns in the data using additional data received from the database 26, as well as detection rules, which rules may be stored in the engine 16 itself or supplied from, for example, the database 26 and/or analysts.

As indicated in FIG. 4, the pricing decision system 18 processes the pricing events and detected patterns by selecting appropriate pricing strategy rules based on specificity, priority and other factors, and then generating pricing actions based on the pricing events, detected patterns and strategy rules. Initially, for a given pricing event and/or pattern, the rules engine 41 of the pricing decision system 18 identifies one or more of the strategies 46a, 46b and 46c that may apply to the pricing event or pattern. If multiple overlapping pricing strategies apply and thus multiple overlapping pricing strategy rule sets consequently apply, then the rules engine 41 selects the rule set 44a, 44b or 44c with the most specificity, unless an analyst assigns an explicit priority. In an exemplary embodiment, the rules engine 41 can be used to optimize the execution of the rules sets 44a, 44b and 44c based on the pricing events and patterns detected by the pattern detection engine 16. In several exemplary embodiments, the pricing actions generated by the pricing decision system 18 are comparisons, recommendations, and/or any combination thereof.

In an exemplary embodiment, at least one of strategies 46a, 46b and 46c is a matching strategy, which is a competitive pricing strategy wherein one airline matches the fare(s) and/or rule(s) of a competitor airline. In an exemplary embodiment, the pricing decision system 18 provides an analyst with the capability to specify parameters and criteria to define which competitor airline carrier to match, when to match, what fares and/or rules to match, and how the match should be made. In several exemplary embodiments, using the rules engine 41 and at least one of the rule sets 44a, 44b and 44c, the pricing decision system 18 automatically specifies parameters and criteria to define which competitor airline to match, when to match, what fares and/or rules to match, and how the match should be made.

In an exemplary embodiment, with respect to which competitor airline carrier to match, the pricing decision system 18 can explicitly specify which carrier to match, and/or can specify the carrier based on which carrier is offering the lowest fare between two locations, or which carrier is offering the highest fare between two locations.

In an exemplary embodiment, with respect to when to match, the pricing decision system 18 can specify that a particular carrier is matched immediately, that another carrier is matched based on one or more conditions after waiting for a predetermined time period such as one day ("match carrier X immediately, but wait one day before matching carrier Y, then match carrier Y based on one or more conditions . . . ").

In an exemplary embodiment, with respect to what fares and/or rules to match, the pricing decision system 18 can specify whether matching is for core fares only, non-core fares, or both core fares and non-core fares. Additionally, the pricing decision system 18 can specify which sister markets to match.

In an exemplary embodiment, with respect to how the match should be made, the pricing decision system 18 can specify how much premium to apply (if any), with the premium over the matching airline being specified separately for one-way fares and round-trip fares. The pricing decision system 18 can specify behavior for flow markets (same fare, surcharge, etc.).

In an exemplary embodiment, the pricing decision system 18 can specify a one-to-one mapping (exact matching), or a custom mapping (custom matching).

In an exemplary embodiment, with respect to one-to-one mapping or exact matching, the pricing decision system 18 can specify the scope at which to match (for example, region, country, city, airport, wildcard, etc.). In an exemplary embodiment, for a fare basis code (FBC) to be exactly matched to another FBC, the pricing decision system 18 must evaluate to true at least the following criteria: same seasonality, same day of week, same tariff, and equivalent rule categories.

In an exemplary embodiment, with respect to custom mapping or custom matching, the pricing decision system 18 can specify the scope at which to match (for example, region, country, city, airport, wildcard, etc.). The pricing decision system 18 can specify which categories must be equivalent in order for an FBC to match to another FBC. For example, the pricing decision system 18 can specify that competing FBC's are considered a match as long two categories are equivalent, such as seasonality and day of week, regardless of whether other categories are equivalent. Additionally, in an exemplary embodiment, for each category, the pricing decision system 18 can specify "partial equality" matches where the values do not have to be exactly the same in order to be considered matches. For example, for a time period (or day/time) category, there are five possible mapping criteria: (1) exact criteria, wherein the time periods are the same (e.g., the first fare basis code (FBC1) day/time is 15 April through 20 May, and the second fare basis code (FBC2) day/time is also 15 April through 20 May); (2) subset criteria, wherein FBC1 day/time is a subset of FBC2 day/time (e.g., FBC1 date/time is 2 August through 23 August, and FBC2 date/time is 14 July through 3 September); (3) superset criteria, wherein FBC1 day/time is a superset of FBC2 day/time (e.g., FBC1 day/time is 14 July through 3 September, and FBC2 day/time is 2 August through 23 August); (4) intersection criteria, wherein FBC1 day/time intersects with FBC2 day/time (e.g., FBC1 day/time is 14 July through 3 September, and FBC2 day/time is 2 August through 11 October); and (5) specific criteria, wherein respective exact values are specified for FBC1 and FBC2 and they are considered a match when they have the exact values, respectively.

In an exemplary embodiment, the pricing decision system 18 can default to one-to-one mapping, rather than to custom mapping, or vice versa.

In an exemplary embodiment, during the operation of the system 10, the pricing decision system 18 communicates with the database 26, the forecast and impact simulation model 20, and the adaptive engine 22.

In an exemplary embodiment, during the operation of the system 10, the regression/calibration engine 29 analyzes the data in the database 26, including the fare and pattern history data 26a, the pricing and industry data 26b, the calibration data 26c, and the other historical data 26d, in order to attempt to forecast or estimate various pricing metrics. To so forecast or estimate, the regression/calibration engine 29 uses statistical methods, including regression analyses, time series analyses, and data mining. The pricing metrics forecasted and/or estimated by the regression/calibration engine 29 include the following: frequency and timing of competitor airlines' sales (how often and when a carrier files sales fares, such as, for example, the first Monday of every month); length of sales (how long the sales fares are typically active before being pulled back, such as, for example, a sales period of 15 days or 10 days); response speeds to fare actions (how long does it take for one airline carrier to respond to another carrier's action); responses to fare actions including fare increases (how often does one airline carrier match another carrier's fare increase (70% of the time, 50% of the time, etc.)); responses to fare actions including fare decreases; responses to fare restructuring including a combination of fare increases and fare decreases (how long does it take for an airline carrier to analyze another carrier's restructuring); correlations of the foregoing metrics to other factors, including macro-economic factors such as GDP growth, inflation, unemployment, oil prices, etc. (for example, the frequency of an airline carrier's fare increases doubles for each $10 increase in oil prices); and typical sell-up amounts for different airline carriers, which may vary by fare amount, geographic entity, etc.

In an exemplary embodiment, during the operation of the system 10, the forecast and impact simulation module 20 receives the pricing actions or decisions generated by the pricing decision system 18, including comparisons, recommendations, and/or any combination thereof, and subsequently provides feedback regarding the impacts of those actions or decisions, thereby enabling a more agile and competitive response. The module 20 uses forecasting to determine such impacts.

In an exemplary embodiment, in addition to receiving inputs from the pricing decision system 18 (with such inputs including the pricing or decisions generated by the pricing decision system 18), the forecast and impact simulation module 20 receives and considers other inputs, such as the following: market share and fare structure of each individual airline carrier, as well as any impact of each pricing action on the market share; price elasticity at market level; various business rules such as, for example, maximum permitted fare changes, minimum gap between fares, maximum gap between fares, etc.; demand forecast at each fare level; and availability at each fare level.

In an exemplary embodiment, in addition to providing feedback regarding the impact of the pricing actions or decisions generated by the pricing decision system 18, the forecast and impact simulation module 20 automatically suggests pricing actions to the pricing decision system 18, pricing strategy managers, analysts, etc. Such suggestions may be based on various metrics such as, for example, market share changes, shifts in booking changes, year-over-year changes in revenue or bookings, suboptimal fare structures (such as when fares are too close or too far away from each other), and various business rules. In several exemplary embodiments, to provide such suggestions, the forecast and impact simulation module 20 employs data mining and optimization methods.

In an exemplary embodiment, during the operation of the system 10, the adaptive engine 22 makes use of forecasting and historical data to suggest changes to existing strategies and propose new strategies, resulting in better responsiveness to competitive industry changes. In several exemplary embodiments, the adaptive engine 22 evolves the logic and strategies of the system 10 to fit airline industry conditions to maintain maximum profitability. In several exemplary embodiments, the adaptive engine 22 is combined in whole in part with the forecast and impact simulation module 20. In several exemplary embodiments, the integration of the forecast and impact simulation module 20 with the pricing decision system 18 and the adaptive engine 22 results in better pricing decisions and increased profitability.

As noted above, the pricing decision system 18 generates pricing actions based on the pricing events, detected patterns and strategy rules. The pricing actions are then fed or otherwise transmitted from the pricing decision system 18 to the pricing fulfillment system 24. The pricing fulfillment system 24 implements the pricing actions, resulting in actions such as, for example, creating matching fares that are to be offered by the airline associated with the system 10, changing fares and/or rules offered or used by the airline, and filing fares and/or rules offered or used by the airline.

In several exemplary embodiments, the system 10 automates pricing actions and strategies, thereby eliminating, or at least significantly reducing, the amount of manual effort by pricing analysts. Moreover, the adaptive nature of the operation of the system 10 reduces the need for constant manual intervention. The increased automation of the system 10 enables the airline associated with the system 10 to cover a larger number of markets with specific strategies, thereby increasing competitiveness.

Figure 5:
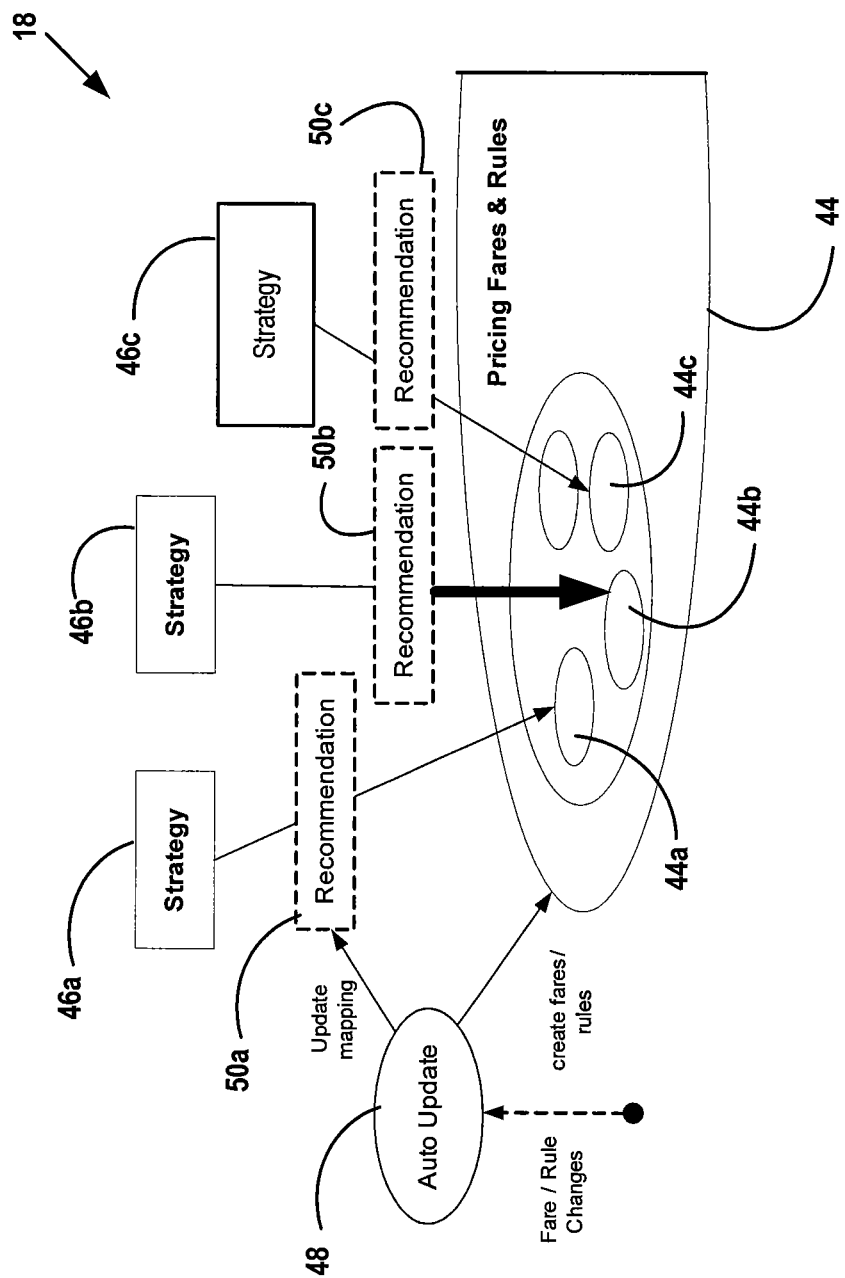

In an exemplary embodiment, as illustrated in FIG. 5 with continuing reference to FIGS. 1-4, the system 10 is an autonomic pricing system having autonomic strategies 46 and the capability to create fares and rules. More particularly, as indicated by a processing block 48, the pricing decision system 18 automatically updates mapping between rules and fares of the airline associated with the system 10 and the airline's competitors in response to the detection of competitors' changes in fares and/or rules. Moreover, also in response to the competitors' fare/rule changes, the pricing decision system 18 creates fares and rules for the airline associated with the system 10, which fares and rules become part of the set of rules 44. By default, the strategies 46 do not generate comparisons; instead, fares/rules are automatically created. The pricing decision system 18 automatically generates recommendations, including recommendations 50*a*, 50*b* and 50*c*. In an exemplary embodiment, the system 10 automatically generates the recommendations 50*a*, 50*b* and 50*c* and applies them in an automatic mode. In an exemplary embodiment, instead of, or in addition to including the automatic mode, the system 10 includes a manual mode, in which an analyst must manually apply one or more of the recommendations 50*a*, 50*b* and 50*c*. In an exemplary embodiment, instead of, or in addition to, one or more of the automatic and manual modes, the system 10 includes an automatic approval mode, in which one or more of the recommendations 50*a*, 50*b* and 50*c* are routed to an analyst for approval before application.

Figure 6:
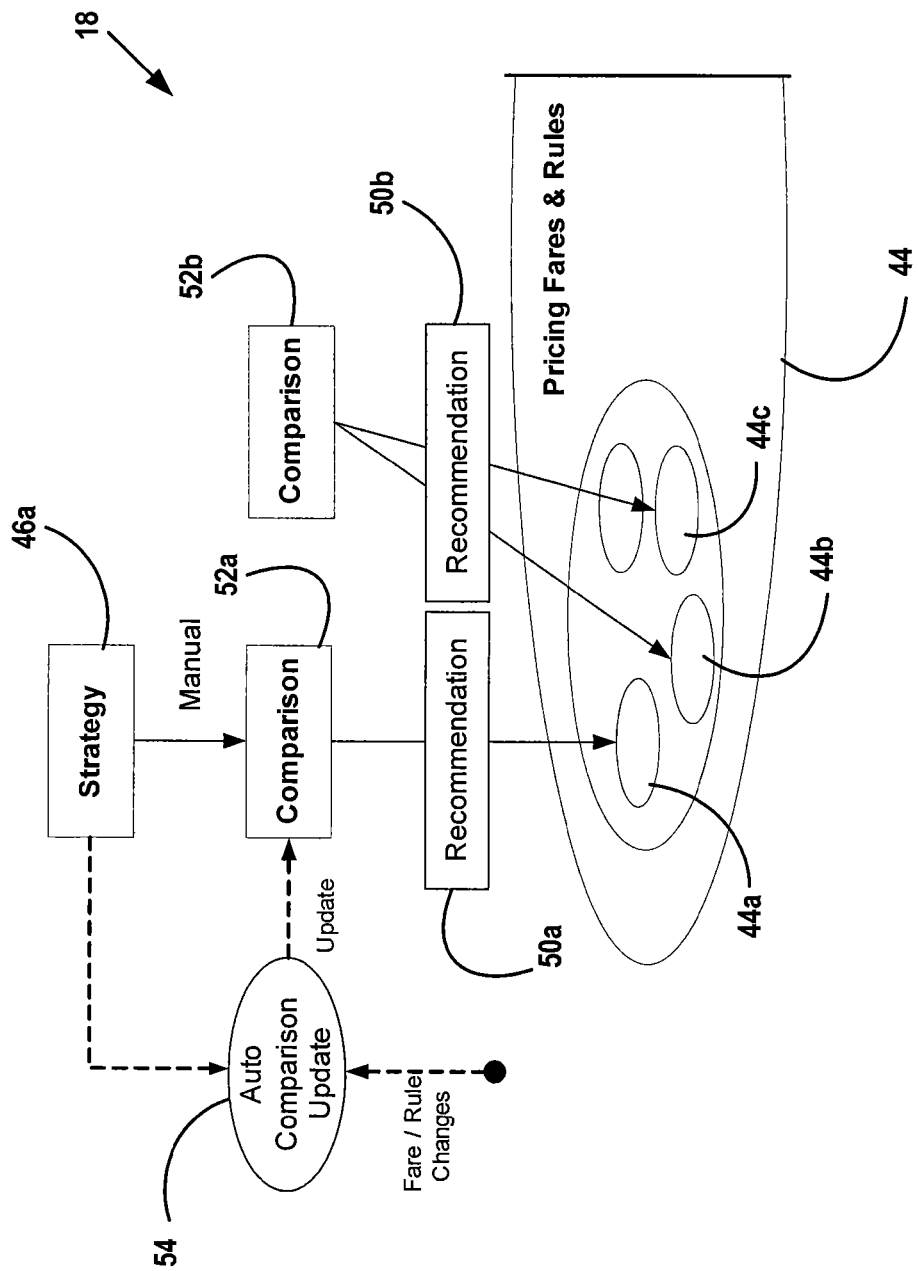

In an exemplary embodiment, as illustrated in FIG. 6 with continuing reference to FIGS. 1-4, during the operation of the system 10, comparisons 52*a* and 52*b* are applied by generating the recommendations 50*a* and 50*b*, respectively. As indicated by a processing block 54, the pricing decision system 18 automatically updates at least the comparison 52*a* in response to the detection of competitors' changes in fares and/or rules. In an exemplary embodiment, an analyst may manually apply the strategy 46*a* as needed. In an exemplary embodiment, the pricing decision system 18 automatically creates fares and rules when necessary to satisfy one or more strategies, such as the strategy 46*a*. In an exemplary embodiment, the system 10 includes one or more of the following: an automatic mode in which the system 10 automatically applies any recommendations; a manual mode in which an analyst must apply any recommendations; and an automatic approval mode in which any recommendation is routed to an analyst for approval before application.

In an exemplary embodiment, during the operation of the system 10, the pricing decision system 18 employs sophisticated logic to determine how to match a competitor carrier's fare. For example, if the competitor carrier raises a fare, the pricing decision system 18 does not match the fare immediately, but instead waits to see if another competitor carrier matches the raised fare and, if so, then the pricing decision system 18 waits a predetermined amount of time (such as a predetermined number of days) and then matches the fare increase.

Figure 7:
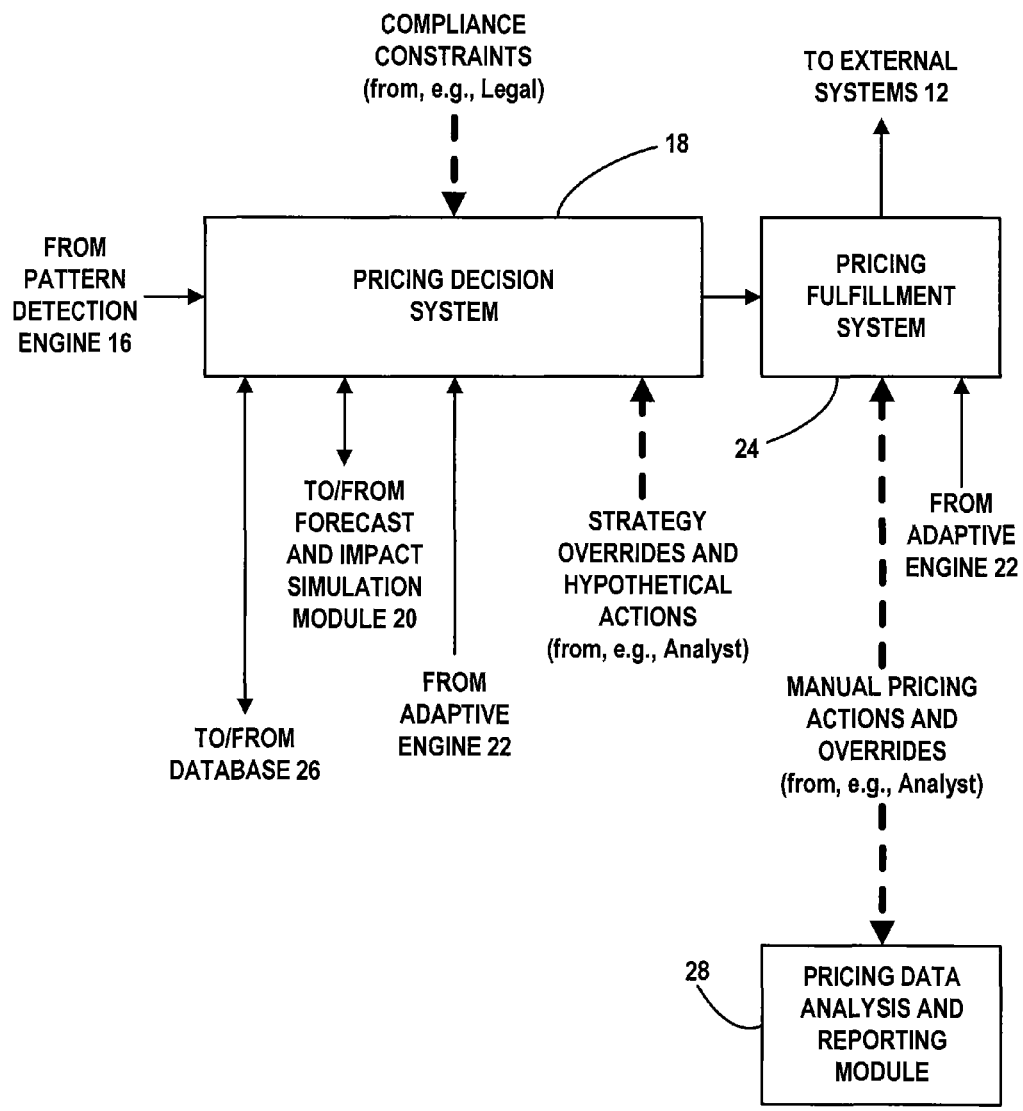
FIG. 7 is a diagrammatic illustration of a portion of the system of FIG. 1, according to an exemplary embodiment.

In an exemplary embodiment, as illustrated in FIG. 7 with continuing reference to FIGS. 1-6, during the operation of the system 10, compliance constraints from, for example, the legal department of the airline associated with the system 10, may be inputted or otherwise applied to, and taken into account by, the pricing decision system 18. Further, strategy overrides and hypothetical actions from, for example, an analyst, may be inputted or otherwise applied to, and taken into account by, the pricing decision system 18. Still further, manual pricing actions and overrides from, for example, an analyst, may be inputted or otherwise applied to the pricing fulfillment system 24, the pricing data analysis and reporting module 28, and/or any combination thereof.

Figure 8:
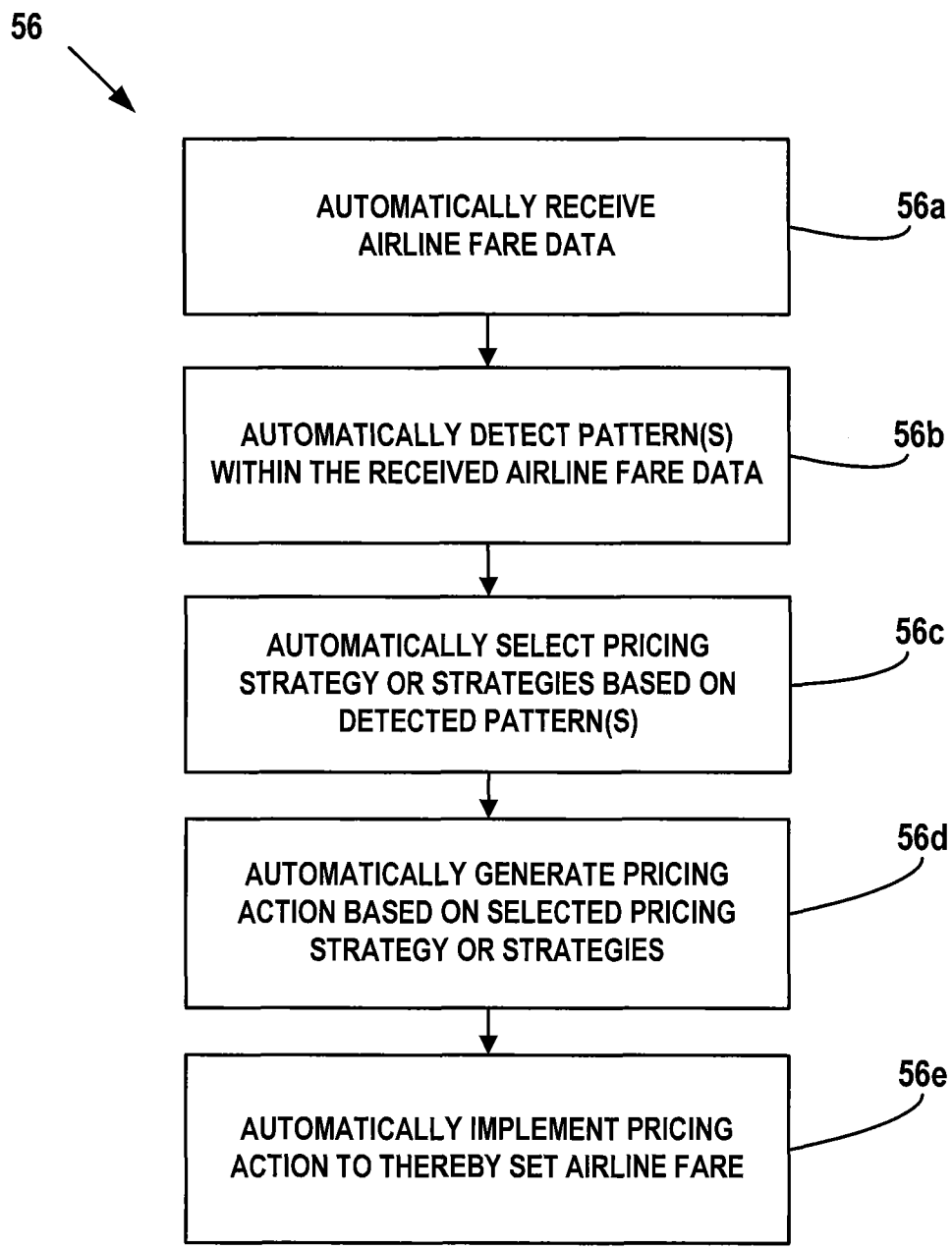
FIG. 8 is a flow chart illustration of a method of operating the system of FIG. 1, according to an exemplary embodiment.

In an exemplary embodiment, as illustrated in FIG. 8 with continuing reference to FIGS. 1-7, a method of operating the system 10 is generally referred to by the reference numeral 56 and includes automatically receiving airline fare data at step 56*a*; automatically detecting pattern(s) within the received airline fare data at step 56*b*; automatically selecting one or more pricing strategies based on the detected pattern(s) at step 56*c*; automatically generating a pricing action based on the selected strategies at step 56*d*; and automatically implementing the pricing action to thereby set an airline fare at step 56*e*.

Figure 9:
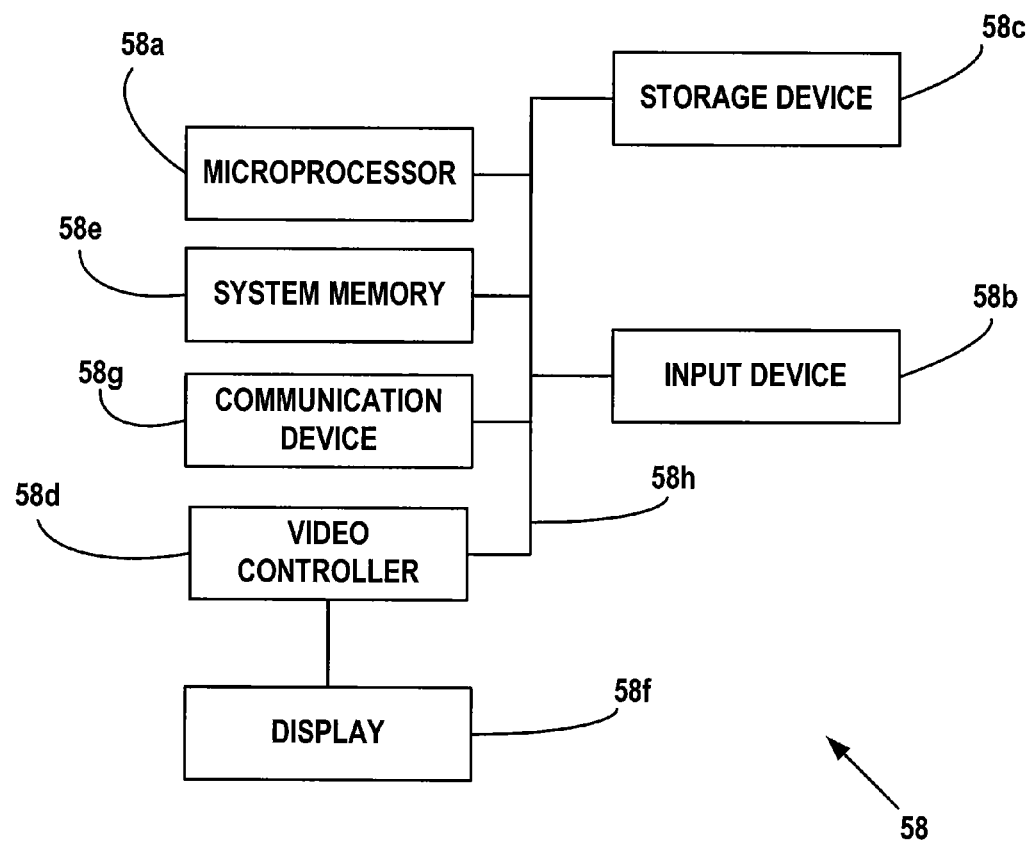
FIG. 9 is a diagrammatic illustration of a node for implementing one or more exemplary embodiments of the present disclosure, according to an exemplary embodiment.

In an exemplary embodiment, as illustrated in FIG. 9 with continuing reference to FIGS. 1-8, an illustrative node 58 for implementing one or more embodiments of one or more of the above-described networks, elements, methods and/or steps, and/or any combination thereof, is depicted. The node 58 includes a microprocessor 58*a*, an input device 58*b*, a storage device 58*c*, a video controller 58*d*, a system memory 58*e*, a display 58*f*, and a communication device 58*g*, all of which are interconnected by one or more buses 58*h*. In several exemplary embodiments, the storage device 58*c* may include a floppy drive, hard drive, CD-ROM, optical drive, any other form of storage device and/or any combination thereof. In several exemplary embodiments, the storage device 58*c* may include, and/or be capable of receiving, a floppy disk, CD-ROM, DVD-ROM, or any other form of computer readable medium that may contain executable instructions. In several exemplary embodiments, the communication device 58*g* may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, smartphones and cell phones.

In several exemplary embodiments, one or more of the components of the system 10 include at least the node 58 and/or components thereof, and/or one or more nodes that are substantially similar to the node 58 and/or components thereof. In several exemplary embodiments, one or more of the above-described components of the node 58 and/or the system 10 include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, any networks and/or one or more portions thereof, may be designed to work on any specific architecture. In an exemplary embodiment, one or more portions of any networks may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a plurality of instructions stored on a computer readable medium may be executed by one or more processors to cause the one or more processors to carry out or implement in whole or in part the above-described operation of each of the above-described exemplary embodiments of the system 10, the method 56, and/or any combination thereof. In several exemplary embodiments, such a processor may include one or more of the microprocessor 58a, any processor(s) that are part of the components of the system 10, and/or any combination thereof, and such a computer readable medium may be distributed among one or more components of the system 10. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

A method of setting a price for a good or service has been described that includes automatically receiving, using one or more computer systems, data associated with a class of goods or services from one or more data sources, wherein the good or service for which the price is to be set is within the class; automatically detecting, using the one or more computer systems, a pattern within the received data; automatically selecting, using the one or more computer systems, a pricing strategy based on the detected pattern; automatically generating, using the one or more computer systems, a pricing action based on the selected pricing strategy; and automatically implementing, using the one or more computer systems, the pricing action to thereby set the price for the good or service. In an exemplary embodiment, the class of goods or services is airline fare data; wherein the good or service is service by an airline from a departure location to a destination location; wherein the price to be set is the airline fare for the service by the airline from the departure location to the destination location; and wherein the one or more data sources include at least one of a global distribution system (GDS) and a computer reservation system (CRS). In an exemplary embodiment, automatically generating the pricing action based on the selected pricing strategy includes automatically applying, using the one or more computer systems, one or more pricing rules associated with the selected pricing strategy. In an exemplary embodiment, the selected pricing strategy includes at least one of the following: a first matching strategy by which airline fares are one-to-one matched; a second matching strategy by which airline fares are custom matched; a third matching strategy by which core airline fares are matched; and a fourth matching strategy by which non-core airline fares are matched. In an exemplary embodiment, the method includes automatically creating, using the one or more computer systems, the one or more pricing rules in response to at least one of automatically receiving the data and automatically detecting the pattern; and automatically updating, using the one or more computer systems, at least one of the first, second, third and fourth matching strategies in response to at least one of automatically receiving the data and automatically detecting the pattern. In an exemplary embodiment, the method includes automatically providing, using the one or more computer systems, feedback regarding the impact of implementing the pricing action.

A system for setting a price for a good or service has been described that includes means for automatically receiving data associated with a class of goods or services from one or more data sources, wherein the good or service for which the price is to be set is within the class; means for automatically detecting a pattern within the received data; means for automatically selecting a pricing strategy based on the detected pattern; means for automatically generating a pricing action based on the selected pricing strategy; and means for automatically implementing the pricing action to thereby set the price for the good or service. In an exemplary embodiment, the class of goods or services is airline fare data; wherein the good or service is service by an airline from a departure location to a destination location; wherein the price to be set is the airline fare for the service by the airline from the departure location to the destination location; and wherein the one or more data sources include at least one of a global distribution system (GDS) and a computer reservation system (CRS). In an exemplary embodiment, means for automatically generating the pricing action based on the selected pricing strategy includes means for automatically applying one or more pricing rules associated with the selected pricing strategy. In an exemplary embodiment, the selected pricing strategy includes at least one of the following: a first matching strategy by which airline fares are one-to-one matched; a second matching strategy by which airline fares are custom matched; a third matching strategy by which core airline fares are matched; and a fourth matching strategy by which non-core airline fares are matched. In an exemplary embodiment, the system includes means for automatically creating the one or more pricing rules in response to at least one of automatically receiving the data and automatically detecting the pattern; and means for automatically updating at least one of the first, second, third and fourth matching strategies in response to at least one of automatically receiving the data and automatically detecting the pattern. In an exemplary embodiment, the system includes means for automatically providing feedback regarding the impact of implementing the pricing action.

An apparatus has been described that includes one or more processors; a computer readable medium operably coupled to the one or more processors; and a plurality of instructions stored on the computer readable medium and executable by the one or more processors, the plurality of instructions including instructions that cause the one or more processors to automatically receive data associated with a class of goods or services from one or more data sources, wherein a good or service for which a price is to be set is within the class; instructions that cause the one or more processors to automatically detect a pattern within the received data; instructions that cause the one or more processors to automatically select a pricing strategy based on the detected pattern; instructions that cause the one or more processors to automatically generate a pricing action based on the selected pricing strategy; and instructions that cause the one or more processors to automatically implement the pricing action to thereby set the price for the good or service. In an exemplary embodiment, the class of goods or services is airline fare data; wherein the good or service is service by an airline from a departure location to a destination location; wherein the price to be set is the airline fare for the service by the airline from the departure location to the destination location; and wherein the one or more data sources include at least one of a global distribution system (GDS) and a computer reservation system (CRS). In an exemplary embodiment, the instructions that cause the one or more processors to automatically generate the pricing action based on the selected pricing strategy include instructions that cause the one or more processors to automatically apply one or more pricing rules associated with the selected pricing strategy. In an exemplary embodiment, the selected pricing strategy includes at least one of the following: a first matching strategy by which airline fares are one-to-one matched; a second matching strategy by which airline fares are custom matched; a third matching strategy by which core airline fares are matched; and a fourth matching strategy by which non-core airline fares are matched. In an exemplary embodiment, the plurality of instructions further includes instructions that cause the one or more processors to automatically create the one or more pricing rules in response to at least one of automatically receiving the data and automatically detecting the pattern; and instructions that cause the one or more processors to automatically update at least one of the first, second, third and fourth matching strategies in response to at least one of automatically receiving the data and automatically detecting the pattern. In an exemplary embodiment, the plurality of instructions further includes instructions that cause the one or more processors to automatically provide feedback regarding the impact of implementing the pricing action. In an exemplary embodiment, the apparatus includes a pricing data acquisition and preparation module; a pattern detection engine operably coupled to the pricing data acquisition and preparation module; a pricing decision system operably coupled to the pattern detection engine; and a pricing fulfillment system operably coupled to the pricing decision system; wherein the one or more processors are part of one of or more of the pricing data acquisition and preparation module, the pattern detection engine, the pricing decision system, and the pricing fulfillment system; and wherein the computer readable medium is part of one of or more of the pricing data acquisition and preparation module, the pattern detection engine, the pricing decision system, and the pricing fulfillment system. In an exemplary embodiment, the apparatus includes a forecast and impact simulation module operably coupled to the pricing decision system; and an adaptive engine operably coupled to each of the pricing decision system and the forecast and impact simulation module.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to a shipping travel leg in which a ship travels from one port to one or more other ports. In an exemplary embodiment, aspects of the present disclosure are readily applicable and/or readily adaptable to a trucking travel leg during which a truck travels from one city to one or more other cities. In an exemplary embodiment, aspects of the present disclosure are readily applicable and/or readily adaptable to a rail travel leg during which a train travels from one city or station to one or more other cities or stations. In an exemplary embodiment, aspects of the present disclosure are applicable and/or readily adaptable to a wide variety of transportation transactions such as, for example, an airline sequence or itinerary (i.e., a plurality of airline flights), a travel leg of an airline sequence or itinerary (i.e., a single airline flight), an airline block, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures.

What is claimed is:

1. A method of setting a first airline fare, the method comprising:
    automatically receiving, using one or more computer systems, data associated with other airline fares from one or more data sources, wherein the one or more data sources comprise at least one of a global distribution system (GDS) and a computer reservation system (CRS);
    automatically detecting, using the one or more computer systems, a pattern within the received data;
    automatically selecting, using the one or more computer systems, a price matching strategy based on the detected pattern; wherein the selected price matching strategy comprises at least one of a first price matching strategy and a second price matching strategy;
        wherein the first price matching strategy specifies one-to-one price matching of the first airline fare to at least a second airline fare on a region-to-region, country-to-country, city-to-city, airport-to-airport, or fare basis code-to-fare basis code basis;
            wherein, when the first airline fare is matched in accordance with the first price matching strategy, at least two of the following categories are equivalent for the matched first and second airline fares: seasonality, day of the week, tariff, or another rule category;
                wherein, when the matched first and second airline fares have equivalent seasonality, the matched first and second airline fares are for respective airline flights occurring during the same season;
                wherein, when the matched first and second airline fares have equivalent days of the week, the matched first and second airline fares are for respective airline flights occurring on the same day of the week;
                wherein, when the matched first and second airline fares have an equivalent tariff, the matched first and second airline fares have the same tariff; and
                wherein, when the matched first and second airline fares have equivalent rule categories, the matched first and second airline fares are for respective airline flights having the same business rules;
        wherein the second price matching strategy specifies price matching the first airline fare to at least a third airline fare on a fare basis code-to-fare basis code basis;
            wherein the first airline fare has a first fare basis code having a first day/time range;
            wherein the third airline fare has a second fare basis code having a second day/time range; and
            wherein the first day/time range of the first fare basis code of the first airline fare is partially equivalent to the second day/time range of the second fare basis code of the third airline fare;
                wherein the partial equivalency between the first and second day/time ranges is selected from the group consisting of exact equivalency, subset equivalency, superset equivalency, and intersection equivalency;
                wherein, when the first and second day/time ranges have exact equivalency, the first day/time range is the same as the second day/time range;
                wherein, when the first and second day/time ranges have subset equivalency, the first day/time range is a subset of the second day/time range such that the first day/time range falls within the second day/time range;
                wherein, when the first and second day/time ranges have superset equivalency, the first day/time range is a superset of the second day/time range such that the second day/time range falls within the first day/time range; and
                wherein, when the first and second day/time ranges have intersection equivalency, the first day/time range overlaps with the second day/time range;
    automatically creating, using the one or more computer systems, one or more pricing rules associated with the selected price matching strategy;
    automatically generating, using the one or more computer systems, a pricing action based on the selected pricing strategy; wherein automatically generating the pricing action based on the selected pricing strategy comprises:
        automatically applying, using the one or more computer systems, the one or more pricing rules associated with the selected pricing strategy; and
    automatically implementing, using the one or more computer systems, the pricing action to thereby set the first airline fare.

2. The method of claim 1, further comprising:
    automatically updating, using the one or more computer systems, one or both of the first and second price matching strategies in response to at least one of the automatically receiving the data and the automatically detecting the pattern.

3. The method of claim 1, further comprising:
    automatically providing, using the one or more computer systems, feedback regarding the impact of implementing the pricing action.

4. An apparatus for setting a first airline fare, the apparatus comprising:
    one or more processors;
    a computer readable medium; and
    a plurality of instructions stored on the computer readable medium and executable by the one or more processors, the plurality of instructions comprising:
        instructions that cause the one or more processors to automatically receive data associated with other airline fares from one or more data sources, wherein the one or more data sources comprise at least one of a global distribution system (GDS) and a computer reservation system (CRS);

instructions that cause the one or more processors to automatically detect a pattern within the received data;

instructions that cause the one or more processors to automatically select a price matching strategy based on the detected pattern; wherein the selected price matching strategy comprises at least one of a first price matching strategy and a second price matching strategy;

wherein the first price matching strategy specifies one-to-one price matching of the first airline fare to at least a second airline fare on a region-to-region, country-to-country, city-to-city, airport-to-airport, or fare basis code-to-fare basis code basis;

wherein, when the first airline fare is matched in accordance with the first price matching strategy, at least two of the following categories are equivalent for the matched first and second airline fares: seasonality, day of the week, tariff, or another rule category;

wherein, when the matched first and second airline fares have equivalent seasonality, the matched first and second airline fares are for respective airline flights occurring during the same season;

wherein, when the matched first and second airline fares have equivalent days of the week, the matched first and second airline fares are for respective airline flights occurring on the same day of the week;

wherein, when the matched first and second airline fares have an equivalent tariff, the matched first and second airline fares have the same tariff; and wherein, when the matched first and second airline fares have equivalent rule categories, the matched first and second airline fares are for respective airline flights having the same business rules;

wherein the second price matching strategy specifies price matching the first airline fare to at least a third airline fare on a fare basis code-to-fare basis code basis;

wherein the first airline fare has a first fare basis code having a first day/time range;

wherein the third airline fare has a second fare basis code having a second day/time range; and wherein the first day/time range of the first fare basis code of the first airline fare is partially equivalent to the second day/time range of the second fare basis code of the third airline fare;

wherein the partial equivalency between the first and second day/time ranges is selected from the group consisting of exact equivalency, subset equivalency, superset equivalency, and intersection equivalency;

wherein, when the first and second day/time ranges have exact equivalency, the first day/time range is the same as the second day/time range;

wherein, when the first and second day/time ranges have subset equivalency, the first day/time range is a subset of the second day/time range such that the first day/time range falls within the second day/time range;

wherein, when the first and second day/time ranges have superset equivalency, the first day/time range is a superset of the second day/time range such that the second day/time range falls within the first day/time range; and wherein, when the first and second day/time ranges have intersection equivalency, the first day/time range overlaps with the second day/time range;

instructions that cause the one or more processors to automatically create one or more pricing rules associated with the selected price matching strategy;

instructions that cause the one or more processors to automatically generate a pricing action based on the selected pricing strategy;

wherein the instructions that cause the one or more processors to automatically generate the pricing action based on the selected pricing strategy comprise:

instructions that cause the one or more processors to automatically apply the one or more pricing rules associated with the selected pricing strategy;

and instructions that cause the one or more processors to automatically implement the pricing action to thereby set the first airline fare.

5. The apparatus of claim 4, wherein the plurality of instructions further comprises:

instructions that cause the one or more processors to automatically update one or both of the first and second price matching strategies in response to at least one of the automatically receiving the data and the automatically detecting the pattern.

6. The apparatus of claim 4, wherein the plurality of instructions further comprises:

instructions that cause the one or more processors to automatically provide feedback regarding the impact of implementing the pricing action.

* * * * *